Figure 1:
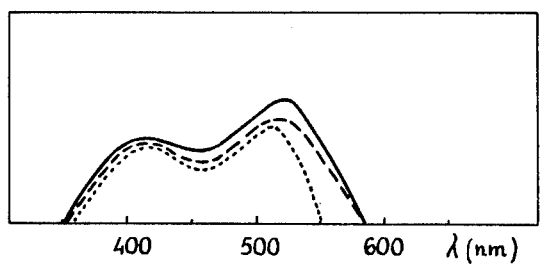

United States Patent [19]

Beretta et al.

[11] 4,035,190

[45] July 12, 1977

[54] DIRECT POSITIVE SILVER HALIDE EMULSIONS CONTAINING QUATERNATED MEROCYANINE DYES

[75] Inventors: Paolo Beretta, Ferrania (Savona); Luigi Magnani, Carcare (Savona), both of Italy

[73] Assignee: Minnesota Mining and Manufacturing Company, St. Paul, Minn.

[21] Appl. No.: 637,290

[22] Filed: Dec. 3, 1975

[30] Foreign Application Priority Data

Dec. 9, 1974 Italy .................................. 54442/74

[51] Int. Cl.² .......................................... G03C 1/10
[52] U.S. Cl. .................................. 96/127; 96/101; 96/139; 96/140; 260/240.1
[58] Field of Search ............ 96/127, 139, 140, 101

[56] References Cited

U.S. PATENT DOCUMENTS

| 2,394,068 | 2/1946 | Kendall et al. ................ 260/310 A |
| 3,539,349 | 11/1970 | Brooker et al. ..................... 96/139 |
| 3,579,344 | 5/1971 | Webster ............................. 96/139 |

*Primary Examiner*—J. Travis Brown
*Attorney, Agent, or Firm*—Cruzan Alexander; Donald M. Sell; Mark A. Litman

[57] ABSTRACT

Quaternated merocyanine dyes for spectrally sensitizing direct positive silver halide emulsions having a first heterocyclic nucleus selected from the group consisting of a 2-isoxazolin-3-furyl-5-one, a 2-isoxazolin-3-thienyl-5-one, a 2-isoxazolin-3-pyrryl-5-one, a 2-pyrazolin-3-furyl-5-one, a 2-pyrazolin-3-thienyl-5-one and a 2-pyrazolin-3-pyrryl-5-one nucleus, linked at the 4-carbon atom thereof through a methine chain to a second heterocyclic nucleus for completing the said quaternated merocyanine dye.

7 Claims, 9 Drawing Figures

— EXAMPLE NO 8
--- DYE D

— EXAMPLE NO 12
--- DYE E

— EXAMPLE NO 9
--- YELLOW PINAKRYPTOL

EXAMPLE NO 10

EXAMPLE NO 11

EXAMPLE NO 14

DIRECT POSITIVE SILVER HALIDE EMULSIONS CONTAINING QUATERNATED MEROCYANINE DYES

The present invention concerns quaternated merocyanine dyes, methods for making such dyes and silver halide emulsions containing the said dyes.

Quaternated merocyanines are known in the art. For example U.S. Pat. No. 2,263,018 relates to filter dyes consisting of quaternated merocyanine dyes. Moreover, quaternated merocyanine dyes are described in "The Cyanine Dyes and Related Compounds" by Frances M. Hamer, Interscience Publishers (1964), pages 519 and 553–556.

Non-quaternated merocyanines containing a 1-phenyl-3-methyl-5-pyrazolone nucleus and a 1-phenyl-3-furyl-5-pyrazolone nucleus are described in U.S. Pat. No. 2,394,068 as valuable sensitizing dyes for gelatinosilver halide photographic emulsions. Further, non-quaternated merocyanine dyes comprising an oxazolone nucleous are disclosed in GB742,206 as useful sensitizers for photographic silver halide emulsions.

All these references do not concern the spectral sensitisation of direct positive silver halide emulsions. So far, to Applicant's best knowledge, the only reference describing certain quaternated merocyanine dyes comprising a 2-isoxazolin-5-one nucleus or a 2-pyrazolin-5-one nucleous that function as electron acceptors spectral sensitizers for direct positive photographic emulsions in U.S. Pat. No. 3,539,349.

Surprisingly, it has now been discovered that by introducing an heterocyclic nucleous selected from the group consisting of furan, thiophene and pyrrole at the 3-carbon atom of a 2-isoxazolin-5-one nucleous or of a 2-pyrazolin-5-one nucleous the sensitizing power of the corresponding dyes is remarkably enhanced with respect to the dyes comprising a 2-isoxazolin-5-one nucleous or a 2-pyrazolin-5-one nucleous but having attached to the 3-carbon atom thereof either a hydrogen atom, a lower alkyl group or an aryl group as described in the U.S. patent of reference.

The novel quaternated merocyanine dyes of this invention show a broader sensitisation band and a shift of the maximum sensitivity towards the green region of the spectrum. The said dyes are further characterized by a selective sensitivity to light in the region between about 350 to 600 nm. The direct positive photographic elements containing the inventive dyes provide clear and sharp and of very good contrast images.

Accordingly, it is a scope of the invention to provide a novel class of quaternated merocyanine dyes useful for spectrally sensitizing direct positive photographic emulsions. It is also scope of this invention to provide novel direct positive silver halide emulsions having improved sensitivity, containing at least one of the inventive quaternated merocyanine dyes. Another scope of the present invention is to provide direct positive photographic elements comprising a base layer having coated thereone or more layers containing an improved direct positive emulsion of this invention. A further scope of the instant invention is to provide methods for preparing the said new quaternated merocyanine dyes. Other scopes will be apparent from the disclosure and the appended claims.

The new class of quaternated merocyanines of the present invention comprises at least one heterocyclic nucleous containing a 5- or 6-membered ring joined by a methine linkage to another heterocyclic nucleus, one of the said heterocyclic nuclei being selected from the group consisting of a 2-isoxazolin-3-furtyl-5-one, a 2-isoxazolin-3-thienyl-5-one and a 2-isoxazolin-3-pyrryl-5-one nucleus, a 2-pyrazolin-3furyl-5-one, a 2-pyrazolin-3-thienyl-5-one and a 2-pyrazolin-3-pyrryl-5-one nucleus, joined at the 4-carbon atom thereof to the said methine linkage, the other of the said heterocyclic nuclei being a desensitizing or a sensitizing nucleus joined at a carbon atom thereof to the said methine linkage to complete the said quaternated merocyanine dye.

This second heterocyclic nucleus is one of the various nuclei known in the art (see for example French Patent 844,236, British Patents 1,082,384, 426,718, 428,359, 606,141) to form merocyanine dyes, especially those of the following classes: thiazole, benzothiazole, napthothiazole, oxazole, benzoxazole, napthoxazole, selenazole, benzoselenazole, naphthoselenazole, pyridine, quinoline, isoquinoline, indolenine, imidazole, benzimidazole, imidazo-[4,5-b]-quinoxaline, 3H-pyrrole-[2,3-b]-pyridine, thiazole-[4,5-b]-quinoline.

Good desensitizing nuclei are those which, when present in the form of a symmetrical carbocyanine dye derived thereof, cause at least 80% loss in the blue speed of a negative silver halide emulsion. Representative examples of desensitizing nuclei can be found e.g. in "The Cyanine Dyes and Related Compounds" by Frances M. Hamer, Interscience Publishers (1964), pp. 728–729 and U.S. Pat. No. 3,431,111 (Col. 1, line 60; Col. 2, line 6).

The quaternated merocyanine dyes of the present invention derived from 2-isoxalin-5-one and 2-pyrazolin-5-one include the dyes represented by the following general formulas:

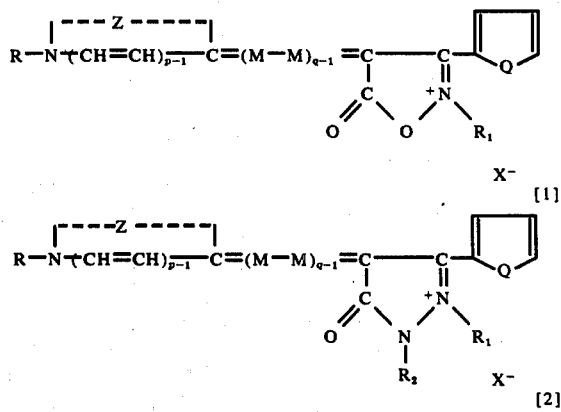

wherein: p and q each represents a positive integer of from 1 to 2; M represents a methine linkage, e.g. —CH=, —C(CH$_3$)=, —C(C$_6$H$_5$)=. R and R$_1$ each represents an alkyl group preferably containing from 1 to 4 carbon atoms, such as e.g., methyl, ethyl, propyl, butyl, isobutyl, hexyl, cyclohexyl, decyl, dodecyl, or a substituted alkyl group preferably containing from 1 to 4 carbon atoms, such as e.g., a hydroxyalkyl group (e.g. β-hydroxyalkyl or Ω-hydroxybutyl); an alkoxyalkyl group (e.g. β-methoxyethyl or Ω-butoxybutyl); a carboxyalkyl group (e.g.β-carboxyethyl or Ω-carboxybutyl); a sulfoalkyl group (e.g.β-sulfo-ethyl or Ω-sulfoethyl or Ω-sulfobutyl); a sulfatoalkyl group (e.g.β-sulfatoethyl or Ω-sulfatobutyl); an acyloxyalkyl group (e.g. β-acetoxyethyl, γ-acetoxypropyl or ω-butyryloxypropyl), an alkoxycarbonylalkyl group (e.g. β- methoxy-carbonyl-ethyl or ω-methoxycarbonyl-butyl); an aryl group or a substituted aryl group (e.g. phenyl, tolyl, naphthyl, chlorophenyl, nitrophenyl, etc.); an aralkyl group (e.g. benzyl, phenethyl, etc.); an alkenyl group (e.g. allyl, 1-propenyl, 2-butenyl). $R_2$ represents an alkyl group (preferably containing from 1 to 4 carbon atoms), e.g. methyl, ethyl, propyl, butyl; or an aryl group, e.g. phenyl, tolyl, xylyl, naphthyl methoxyphenyl, cyanophenyl, nitrophenyl, chlorophenyl, 2,5-diclorophenyl, 2,4,6-trichlorophenyl. $X^-$ represents an acid anion, e.g. chloride, bromide, iodide, thiocyanate, sulfamate, perchlorate, p-toluene-sulfonate, methylsulfate, ethyl-sulfate, Q represents O, S NH. Z represents the non-metallic atoms required to complete a sensitizing or preferably desensitizing heterocyclic nucleus containing from 5 to 6 atoms in the heterocyclic nucleus, which nucleus may also include more than one hetero-atom, such as oxygen, sulfur, selenium or nitrogen; typical representatives are e.g. a nucleus of the thiazole series (e.g. thiazole, 4-methyl-5-phenyl-thiazole, 5-methyl-thiazole, 5-phenyl-thiazole, 4,5-dimethyl-thiazole, 4,5-diphenyl-thiazole, 4-(2-thienyl)-thiazole or 4-nitro-thiazole; a nucleus of the benzothiazole series (e.g. benzothiazole, 4-chloro-benzothiazole, 5-nitro-benzothiazole, 5-chloro-benzothiazole, 6-nitro-benzothiazole, 5,6-dinitro-benzothiazole, 6-chloro-benzothiazole, 7-chloro-benzothiazole, 5,6-dichloro-benzothiazole, 5,7-dichloro-benzothiazole, 4-methyl-benzothiazole, 5-methyl-benzothiazole, 6-methyl-benzothiazole, 5-bromo-benzothiazole, 6-bromo-benzothiazole, 5-phenyl-benzothiazole, 6-phenyl-benzothiazole, 4-methoxy-benzothiazole, 5-methoxy-benzothiazole, 6-methoxy-benzothiazole, 5-bromo-benzothiazole, 5-iodo-benzothiazole, 6-iodo-benzothiazole, 4-ethoxy-benzothiazole, 5-ethoxy-benzothiazole, 4,5,6,7-tetrahydrobenzothiazole, 5,6-dimethoxy-benzothiazole, 5-hydroxy-benzothiazole, 6-hydroxy-benzothiazole); a nucleus of the naphthothiazole series (e.g. α-napthothiazole, β-naphthothiazole, 5-methoxy-β-naphthothiazole, 5-ethoxy-β-naphthothiazole, 8-methoxy-α-naphthothiazole); a nucleus of the napthothiazole series having a nitrogroup; a nucleus of the oxazole series (e.g. 4-methyl-oxazole, 4-nitro-oxazole, 5-methyl-oxazole, 4-phenyl-oxazole, 4,5-diphenyl-oxazole, 4-ethyloxazole, 4,5-dimethyl-oxazole, 5-phenyl-oxazole); a nucleus of the benzoxazole series (e.g. -benzoxazole, 5-chloro-benzoxazole, 5-nitro-benzoxazole, 5-methyl-benzoxazole, 5-phenyl-benzoxazole, 6-nitro-benzoxazole, 6-methylbenzoxazole, 5,6-dinitro-benzoxazole, 5,6-dimethyl-benzoxazole, 4,6-dimethyl-benzoxazole, 5-methoxy-benzoxazole, 5-ethoxy-benzoxazole, 5-chlorobenzoxazole, 5-bromo-benzoxazole, 5-iodo-benzoxazole, 6-methoxy-benzoxazole, 5-hydroxy-benzoxazole, 6-hydroxy-benzoxazole); a nucleus of the naphthoxoazole series (e.g. α-naphthoxazole β-naphthoxazole); a nucleus of the naphthoxazole series substituted with a nitro-group; a nucleus of the selenazole series (e.g. selenazole, 4-methyl-selenazole, 4-phenyl-selenazole); a nucleus of the benzoselenazole series (e.g. benzoselenazole, 4-nitrobenzoselenazole, 6-nitrobenzoselenazole, 5-chloro-benzoselenazole, 5-methoxy-benzoselenazole, 5-hydroxy-benzoselenazole, 5-nitro-benzoselenazole, 4,5,6,7-tetra-hydro-benzoselenazole); a nucleus of the napthoselenazole series (e.g. α-naphtho-selenazole, β-naphtho-selenazole); a nucleus of the naphthoselenazole series substituted with a nitro-group; a nucleus of the pyridine series (e.g. pyridine, 2-pyridine, 5-methyl-2-pyridine, 4-pyridine, 3-methyl-4-pyridine); pyridines substituted with a nitro-group; a nucleus of the quinoline series (e.g. quinoline, 2-quinoline, 3-methyl-quinoline, 5-ethyl-quinoline, 6-chloroquinoline, 8-chloro-quinoline, 6-methoxy-quinoline, 8-ethoxy-quinoline, 8-hydroxyquinoline); a nucleus of the 4-quinoline series (e.g. 6-methoxy-4-quinoline, 7-methoxy-4-quinoline, 7-methyl-4-quinoline, 8-chloro-4-quinoline); a nucleus of the 1-isoquinoline series (e.g. 3,4-dihydro-1-isoquinoline, 6-nitro-1-isoquinoline); 3-isoquinoline, etc.; quinolines having a nitro-substituent; a nucleus of the 3,3-dialkyl-indolenine series (e.g. 3,3-dimethyl-5 or 6-cyano-indolenine, 3,3-dimethyl-5 or 6-nitro-indolenine, 3,3-dimethyl-5-chloro-indolenine, 3,3-dimethyl-5-phenylsulfonyl-indolenine, 3,3-dimethyl-5-benzoyl-indolenine); a nucleus of the imidazole series (e.g. imidazole, 1-alkyl-imidazole, 1-alkyl-4-phenyl-imidazole, 1-alkyl-4,5-dimethyl-imidazole); a nucleus of the benzimidazole series (e.g. 1-alkyl-benzimidazole, 1-aryl-5,6-dichlorobenzimidazole); a nucleus of the napthimidazole series (e.g. -1-alkyl-α-naphthimidazole, 1-aryl-β-naphthimidazole, 1-alkyl-5-methoxy-α-naphthimidazole).

Preferred quaternated merocyanine dyes of the present invention do include a first nucleus chosen within the class of a 1-isoxazoline-3-furyl-5-one, 1-isoxazolin-3-thienyl-5-one, 2-isoxazolin-3-pyrryl-5-one, 2-pyrazolin-3-furyl-5-one, 2-pyrazolin-3-thienyl-5-one, 2-pyrazolin-3-pyrryl-5-one joined through a methine chain in 4 position of said nucleus with a second nucleus chosen within the class of thiazole, benzothiazole, napthothiazole, oxazole, benzoxazole, naphthoxazole, selenazole, benzoselenazole, naphthoselenazole, pyridine quinoline, isoquinoline, indolenine, imidazole, benzimidazole, imidazo-[4,5-b]-quinoxaline, 3-H-pyrrole-[2,3-b]-pyridine, thiazole-[4,5-b]-quinoline and preferably selected from the groups consisting of a 2,3,3-trimethyl-5-phenyl-sulfonyl-indolenine, a 2,3,3-trimethyl-5-benzoyl-indolenine nucleus; a 1-alkyl-2-phenyl-5-phenyl-sulfonyl-indole (e.g. 1-methyl-2-phenyl-5-phenyl-sulfonyl-indole, 1-cyanoethyl-2-phenyl-5-phenylsulfonyl-indole), a 1-aryl-2-phenyl-5-phenyl-sulfonyl-indole (e.g. 1,2-diphenyl-5-phenyl-sulfonyl-indole) (v. U.S. Pat. Appln. Ser. No. 478,710 filed June 12, 1974, on the Applicant); a di-halogeno-benzothiazole (e.g. 5,6-dichloro-benzothiazole, 5,7-dichlorobenzothiazole) (v. U.S. Pat. Appln. Ser. No. 478,616 filed June 12, 1974, of the Applicant); or of the nitrobenzothiazole series (e.g. 5-nitro-benzothiazole, 6nitro-benzothiazole, 5chloro-6-nitrobenzothiazole); and of the homologous series obtained by substituting sulfur with oxygen or selenium, or of the imidazo[4,5-b]quinoxaline series, 1,3-dialkyl-imidazo[4,5-b]quinoxaline, 1,3-diethyl-imidazo[4,5-b]quinoxaline, 6-chloro-1,3-diethyl-imidazo[4,5-b]quinoxaline, 1,3-dialkenyl-imidazo[4,5-b]quinoxaline, 1,3-diethyl-imidazo[4,5-b]quinoxaline 6,7-dichloro-1,3-diallyl-imidazo[4,5-b]quinoxaline, 1,3-diaryl-imidazo[4,5-b]quinoxaline, 1,3-diphenyl-imidazo[4,5-b]quinoxaline, 6-chloro-1,3-diphenyl-imidazo[4,5-b]-quinoxaline); or of the 3H-pyrrolo-[2,3-b]pyridine series (e.g. 3,3-dialkyl-3H-pyrrolo[2,3-b]pyridine, 3,3-diethyl or 3,3-dimethyl-3H-pyrrolo[2,3-b]pyridine) or of the 3H-nitro indole series (e.g. 3,3-dialkyl-3H-nitro-indole, 3,3-dimethyl or 3,3-diethyl-3H-nitro-3H-indole); or of the thiazole [4,5-b]quinoline, and the nitro-quinoline series (e.g. 5-nitro-quinoline, 6-nitro-quinoline, etc.).

With regard to the above mentioned substituent group (i.e. R, $R_1$, $R_2$, $X^-$ and Z) the size of the groups is not believed to be of any substantive significance in the practice of this invention. Size changes may only require modification of solvents necessary to include them in direct positive emulsions, but the action of these dyes is believed the same substantially without regard to size.

From what above, it will be clear that Z constitutes the atoms necessary for completing a heterocyclic nucleus of the type used for making merocyanines. For purposes of economy, the following moiety sizes are generally preferred. The moiety containing Z should have no more than 50 carbon atoms and no more than 10 non-metallic hetero-atoms (metal atoms may appear in these groups only in the form of salts). No more than 5 heteroatoms should appear in the ring itself. It is more preferred that such moiety contains no more than 30 carbon atoms and most preferred that it contains no more than 20 carbon atoms. For groups R and $R_1$, where they are alkyl groups, it is generally preferred to have no more than 18 carbon atoms and most preferred to have no more than 12 carbon atoms and with up to 5 heteroatoms. The generally preferred aryl groups of this invention (including those in aralkyl groups) are phenyl and naphthyl and derivatives thereof having no more than 10 non-metallic heteroatoms, chosen within the class of oxygen, sulphur and nitrogen. It is more preferred to have no more than 20 carbon atoms and most preferred having no more than 12 carbon atoms.

The quaternated merocyanine dyes of the present invention defined by formulas [1] and [2] above can be prepared by various methods. For example one convenient method for many of these dyes is to condense 1) a heterocyclic compound of formula:

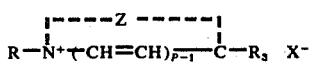 [3]

wherein R,Z,p and $X^-$ are as previously defined and $R_3$ represents an alkyl group, e.g., methyl, ethyl, benzyl, etc., with a heterocyclic compound having formula

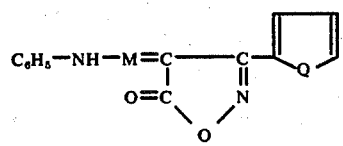 [4]

or

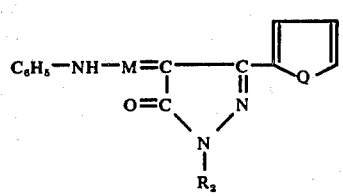 [5]

wherein; M, Q, $R_2$ are as previously defined, in approximately equimolar proportions, in the presence of a basic condensing agent, such as triethylamine, in an inert solvent medium. The crude dyes are separated and purified by one or more recrystallizations from suitable solvents. The pure dyes are then quaternated by heating them with conventional quaternizing agents such as dimethylsulfate, methyl-p-toluensulfonate, 1,3-propan-sultone, 2,4-butane-sultone, etc. The crude quaternated dyes can be further purified by crystallization.

Quaternated merocyanine dyes of the present invention defined by formulas [19 and [2], herein $q = 2$ and $M = CH$, can be prepared by reacting a compound having formula:

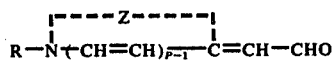 [6]

wherein R, Z and p have the above mentioned definitions, with a compound selected from those represented by formulas;

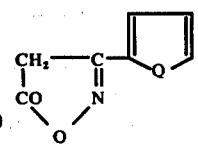 [7]

or

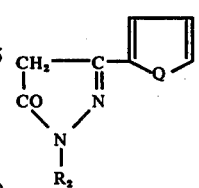 [8]

wherein: Q and $R_2$ are as previously defined.

The condensations are carried out in the presence of acetic acid or acetic anhydride; the crude dyes obtained by cooling, are purified by crystallization from a suitable solvent. The pure dyes are then quaternated by conventional methods such as previously described.

The quaternated merocyanine dyes of the invention defined by formula [1] and [2] can be prepared also by heating a mixture of (1) a heterocyclic compound of formula:

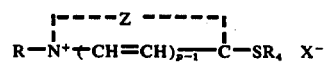 [9]

wherein; R,Z,p and $X^-$ are as previously defined, and $R_4$ represents an alkyl or aryl group, e.g. methyl, ethyl, phenyl, etc., and (2) a heterocyclic compound like those represented by the following formulas:

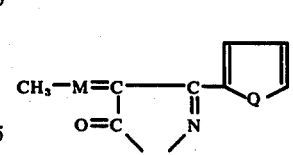 [10]

or

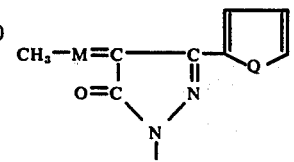 [11]

wherein: M, $R_2$ and Q are as previously defined, in approximately equimolar proportions, in the presence of a basic condensing agent, such as triethyl-amine, in an inert solvent medium, like ethanol.

The so obtained crude dyes can be purified by crystallization from suitable solvents.

The pure dyes can be then quaternated as previously described.

Another useful method for preparing some of the dyes represented by formulas [1] and [2] is to condense 1) a heterocyclic compound of formula:

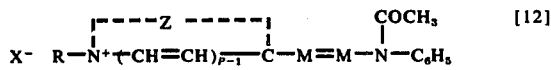

wherein: R, Z, p, M and X$^-$ are as previously defined, with 2) a heterocyclic compound defined by formulas [7], [8], [10] and [11], in approximately equimolar proportions, in an inert solvent medium. The so obtained crude dyes are purified by one or more crystallizations from suitable solvents. The purified dyes are then reacted with conventional quaternazing agents in the usual way and as described in the following examples.

The following examples will better illustrate the present invention in its different aspects, viz. preparations of intermediates, dyes as well as their use in light-sensitive emulsions.

EXAMPLE 1

2-isoxazoline-3-furyl-5-one

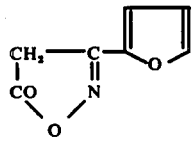

A mixture of 14 g of α-furoylacetic acid ethyl ester [prepared according to what reported by H. A. Torrey and J. E. Zanetti in Amer. Chem. J. 44 (1910) 405–407 and by J. E. Zanetti and C. O. Beckmann in J. Amer. Chem. Soc., 50 (1928) 1440–1441] and 7 g. of hydroxylamine hydrochloride was dissolved in 42 ml. of ethanol containing also 8.4 ml. of distilled water. The solution was made basic by addition of KOH solution (30%) and heated to reflux for 30 minutes; after cooling and addition of diluted HCl until the pH was acid, the separated solid was filtered on a buckner and washed with water until the washings were neutral. The raw solid product purified by solution in 60 ml. of NaOH (10%) and heating to reflux for 30 minutes; the product was separated by adding to this solution 40 ml. of HCl (37%) and cooling. The solid obtained was collected on a buckner and washed repeatedly with water. Yield: 3.0 g. of pure product having a M.P. = 153°–154.5° C. (Bibliogr. Ref. M.P. = 147°–148° C).

| Percent analysis: | Calculated | Found |
|---|---|---|
| C% | 55.63 | 55.45 |
| H% | 3.33 | 3.28 |
| N% | 9.27 | 9.23 |

The product can be prepared also by following the procedures described by H. A. Torrey and J. E. Zanetti in Amer. Chem. J. 44 (1910), 409–410.

EXAMPLE 2

1-phenyl-3-furyl-2-pyrazolin-5-one

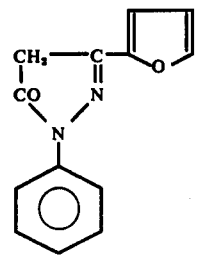

A mixture of 9.1 g. of α-furoylacetic acid ethyl ester, 5.4 g. of phenylhydrazine was heated 20 minutes on a steam bath. During the heating, the solution solidified for the separation of the pyrazolone. The solid raw product was collected on a buchner and washed repeatedly with ether; after a crystallization from ethanol, 5.6 g. of pure product were obtained. M.P. = 176°–178° C. (Bibliogr. Ref. 179° C.).

| Percent analysis: | Calculated | Found |
|---|---|---|
| C% | ·69.02 | 68.76 |
| H% | 4.46 | 4.49 |
| N% | 12.38 | 12.37 |

The product can be prepared also by following the method described by H. A. Torrey and J. E. Zanetti in Am. Chem. Journal 44 (1910) 416–417.

EXAMPLE 3

α-thienoyl-acetic acid-ethyl ester

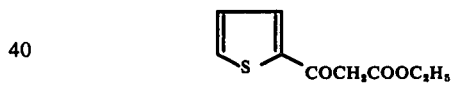

A mixture formed by 250 ml. of dry xylene and 120 ml. of dry absolute ethanol was placed in a liter flask. To this was added 15 g. of metallic sodium squeezed through a sodium press: during the addition the temperature was kept around 70°–80° C. and the final solution resulted yellow in color. The excess xylene was distilled off under a low stream of hydrogen gas. The flask was then equipped with a reflux condenser and a mixture of 45 g. of ethyl-2-thiophene-carboxylate (freshly distilled under vacuum) and 95 ml. of dry ethyl acetate was added. The solution was finally heated to reflux and after two hours 80 ml. of dry ethyl acetate were added to keep the mixture liquid. The heating to reflux was continued for 15 hours protecting the reaction flask from humidity by anhydrous CaCl$_2$ valves. At the end of the reaction, the solution was evaporated under vacuum and the oil residue was acidified with diluted HCl to liberate the ester, extracted with ether and dried with anhydrous sodium sulfate; the ether and the unchanged esters were distilled off and the ketonic ester (α-thienoyl-acetic acid ethyl-ester) was distilled under vacuum by collecting the fraction passed from 144° C. to 148° C. at 1.5 mm Hg. pressure. The ester was distilled again under vacuum obtaining 22 g. of pure product having M.P. = 143°–145° C. at 1.4 mm. Hg.

| Percent analysis: | Calculated | Found |
|---|---|---|
| C% | 54.53 | 54.24 |
| H% | 5.08 | 5.08 |
| S% | 16.18 | 16.46 |

EXAMPLE 4

2-isoxazoline-3-thienyl-5-one

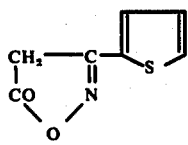

A mixture of 20 g of α-thienoyl-acetic acid ethylester and 9.2 g. of hydroxylamine hydrochloride was dissolved in 55 ml. of ethanol containing also 11 ml. of distilled water. The solution was basified with a 30% solution of KOH and heated to reflux for 30 minutes. The mixture was then cooled at 40° C. and made acid by addition of conc. HCl; after standing and cooling overnight, the raw product was collected on a buchner and washed with water until the washing was neutral. After crystallization from chloroform, 6 g. of pure product were obtained having M.P. = 138°–139° C.

| Percent analysis: | Calculated | Found |
|---|---|---|
| C% | 50.29 | 49.69 |
| H% | 3.01 | 2.99 |
| N% | 8.38 | 8.37 |
| S% | 19.18 | 19.06 |

EXAMPLE 5

2-methyl-3-furyl-4-[(1'-ethyl-3',3'-dimethyl-5'-phenyl-sulfonyl-indolenine-2'-ylidene)-ethylidene]-2-isoxazolin-5-one perchlorate

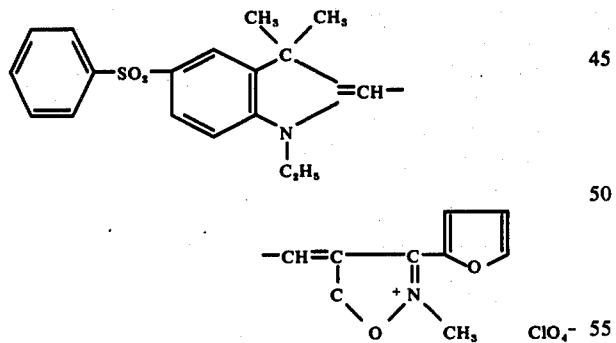

3.55 g. of 1-ethyl-2-formyl-methylene-3,3-dimethyl-5-phenylsulfonyl-indolenine and 1.51 g. of 3-furyl-2-isoxazolin-5-one were dissolved in a mixture of 12 ml. of acetic anhydride and 7 ml. of acetic acid and the solution heated to reflux for 5 minutes. After cooling overnight the dye separated; it was then filtered on a buchner and washed with ethanol. Yield: 3.95 g. of merocyanine having $\lambda_{max}$ = 474 nm. (ethanol). 2.37 of merocyanine was quaternized by reaction with 5 ml. of freshly distilled dimethylsulfate by heating at 120° C. for 15 minutes. The mixture was poured into ethyl ether and the separated gummy product was washed repeatedly with ether. The dye was then dissolved in a mixture of 10 ml. of acetic acid and 10 ml. of ethyl alcohol and precipitated as perchlorate by adding to this an aqueous solution of ammonium perchlorate. Yield: 0.6 g. M.P. = 148°–154° C. $\lambda_{max}$ = 473 nm. (ethanol).

EXAMPLE 6

2-methyl-3-furyl-4-[(1'-ethyl-3',3'-dimethyl-5'-benzoylindolenine-2'-ylidene)-ethylidene]-2-isoxazolin-5-one perchlorate

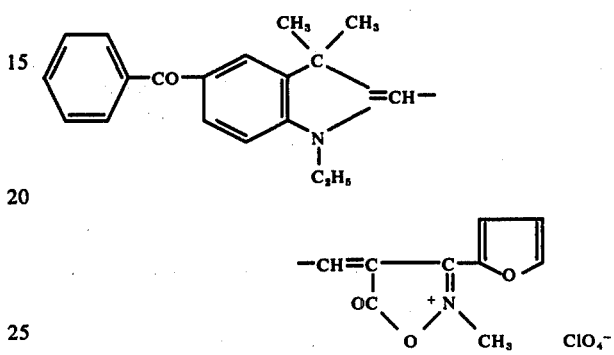

A mixture of 3.2 g. of 1-ethyl-2-formyl-methylene-3,3-dimethyl-5-benzoyl-indolenine, 1.5 g. of 3-furyl-2-isoxazolin-5-one, 12 ml. of acetic anhydride and 7 ml. of acetic acid was boiled for 5 minutes. After overnight standing, the dye crystallized out as brilliant needles; it was collected on a buchner and dried in a desicator. The merocyanine dye obtained (4.18 g.) was reacted with 12 ml. of freshly distilled dimethylsulfate by heating at 120° C. for 15 minutes. After cooling, the reaction mixture was stirred in ether and the ether layer decanted. The crude dye was dissolved in a mixture ethanol-acetic acid (1:1) and the solution poured into aqueous ammonium perchlorate. After the precipitated dye has had two washings with ethanol and ether, the yield of pure dye was 4.0 g. with M.P. = 226°–231° C. $\lambda_{max}$ = 473 nm. (Ethanol).

EXAMPLE 7

2-methyl-3-furyl-4-[(3'-ethyl-6'-nitro-benzothiazole-2'-ylidene)-ethylidene]-2-isoxazolin-5-one methyl-sulfate

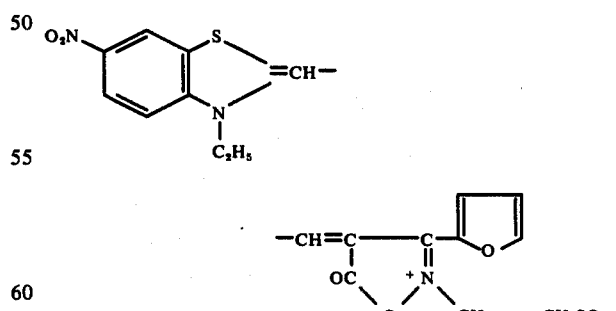

A mixture of 2-formyl-methylene-3-ethyl-6-nitro-benzothiazole (2.5 g.), 3-furyl-2-isoxazolin-5-one (1.5 g.), pyridine (20 ml.) and acetic anhydride (2 ml.) was boiled for 5 minutes. Upon cooling, the dye separated from the reaction mixture; it was then filtered on a buchner and washed with ethanol and ether. The crude dye obtained (3 g.) was purified by crystallization from pyridine.

Yield: 1.7 g. ($\lambda_{max}$ = 507 nm. -dimethylformamide-toluolated ethyl alcohol).

The pure merocyanine was quaternized with 5 ml. of purified dimethyl sulfate by heating at 125° C. for 15 minutes. Upon cooling, the solution was extracted with ethyl ether until the ether was colorless. The semi-solid gummy product, thus obtained, was dissolved in 120 ml. of boiling ethyl alcohol; after under vacuum concentration and overnight standing, 0.75 g. of pure dye were obtained. M.P. = 260°–264° C. $\lambda_{max}$ = 458 nm. (toluolated ethanol).

EXAMPLE 8

2-methyl-3-furyl-4-[(1',3'-diethyl-imidazo-[4,5-b]quinoxaline-2'-ylidene)-ethylidene]-2-isoxazolin-5-one iodide

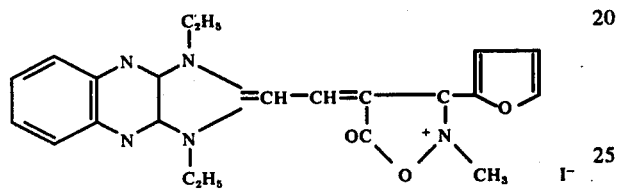

A mixture of 2.76 g. of 1,3-diethyl-2-methyl-imidazo-[4,5-b]-quinoxaline iodide, 2.54 g. of 3-furyl-4-anilino-methylene-2-isoxazolin-5-one, 20 ml. of acetic anhydride and 2.5 ml. of thienyl-amine was boiled for 5 minutes. After cooling, the crude dye obtained was collected on a buchner and washed with ether. 2 g. of pure dye were obtained. $\lambda_{max}$ = 504 (dimethylformamide-ethanol). The pure merocyanine was reacted with 3.6 ml. of freshly distilled dimethylsulfate at 135° C. for 20 minutes. The solution was stirred in ether and the ether layer decanted. After two more ether treatments, the crude dye was dissolved in ethanol and the solution poured into aqueous potassium iodide. After standing, the dye obtained was purified by crystallization from ethanol.

Yield: 1.2 g. of pure dye having a M.P. = 211°–216° C. $\lambda_{max}$ = 446 nm. (toluolated ethanol).

EXAMPLE 9

1-phenyl-2-ethyl-3-furyl-4-[(1'-ethyl-3',3'-dimethyl-5'phenyl-sulfonyl-indolenine-2'-ylidene)-ethylidene]-2-pirazolin-5-one ethyl-sulfate.

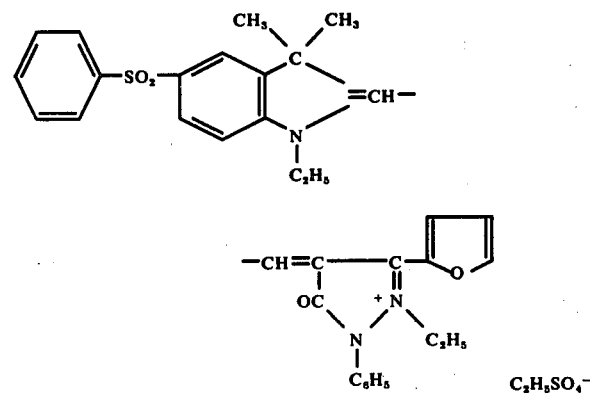

3.55 g. of 1-ethyl-2-formyl-methylene-3,3-dimethyl-5-phenyl-sulfonyl-indolenine and 2.26 g. of 1-phenyl-3-furyl-2-pirazolin-5-one were dissolved in 15 ml. of acetic anhydride containing also 7 ml. of acetic acid. The solution was heated to reflux for 5 minutes; after cooling the reaction mixture was poured into 800 ml. of hot water. The solid obtained was collected on a buchner and washed repeatedly with hot water. Yield: 5.2 g. of raw dye; after crystallization from 130 ml. of a mixture of dimethyl-formamide plus toluolated ethanol (1:1), 3.6 g. of pure dye were obtained ($\lambda$max = 472 nm, dimethyl-formamide-toluolated ethanol 1:1). The merocyanine was quaternated by reaction with 14 ml. of freshly purified diethylsulfate by heating on oil bath at 150° C. for 20 minutes. After cooling, the reaction solution was poured into 700 ml. of ether; the separated gummy product became solid on standing and by repeatedly washings with ether. The raw dye (4.4 g.) thus obtained was purified by solution in 20 ml. of hot ethanol and precipitation by adding ether. Yield: 3.0 g. of pure dye having M.P. = 142°–150° C. $\lambda_{max}$ = 480 nm. (ethanol).

EXAMPLE 10

1-phenyl-2-ethyl-3-furyl-4-[(3'-ethyl-6'-nitro-benzo-thiazole-2'-ylidene)-ethylidene]-2-pyrazolin-5-one ethyl-sulfate

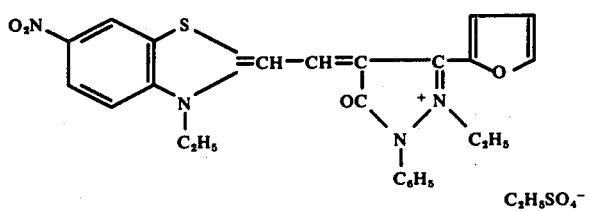

A mixture formed by 10 ml. of acetic anhydride, 5 ml. of acetic acid, 2.5 g. of 2-formyl-methylene-3-ethyl-6-nitro-benzothiazole and 2.26 g. of 1-phenyl-3-furyl-2-pyrazolin-5-one was boiled for 5 minutes. The raw dye, separated during the heating, was collected on a buchner and washed with ethyl alcohol until the washings were colorless. Yield: 4.4 g. of raw dye which was crystallized from 21 ml. of dimethyl-formamide, thus obtaining 3.3 g. of pure merocyanine having $\lambda_{max}$ = 506 nm. (dimethyl-formamide-toluolated ethanol). The quaternization reaction was carried out in the usual way by reacting the merocyanine with freshly distilled diethylsulfate (11 ml.) at 150° C. for 40 minutes. The raw dye obtained, after pouring the reaction mixture into ether, was purified by repeatedly washing with ether. 1.4 g. of pure dye were obtained, having M.P. = 136°–142° C. $\lambda_{max}$ = 468 nm (toluolated ethanol).

EXAMPLE 11

1-phenyl-2-ethyl-3-furyl-4-[(1'-ethyl-3',3'-dimethyl-5'-benzoylindolenine-2'-ylidene)-ethylidene]-2-pirazolin-5-one ethyl-sulfate

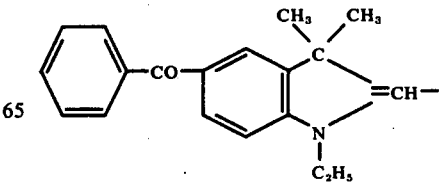

-continued

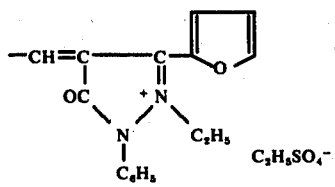

A mixture of 15 ml. acetic anhydride and 7 ml. of acetic acid was used to dissolve 3.19 g. of 1-ethyl-2-formyl-methylene-3,3-dimethyl-5-benzoylindolenine and 2.26 g. of 1-phenyl-3-furyl-2-pyrazolin-5-one. After 5 minutes of boiling, the solution was poured into hot water; the separated gummy product was worked out with hot water again until it became a brown solid. After a crystallization from 200 ml. of ethanol, 3.4 g. of pure dye were obtained. The pure merocyanine was quaternated in the usual way by heating the dye with 4 ml. of freshly distilled diethyl sulfate at 120° C. for 15 minutes. After cooling, the solution obtained was washed with ether, until the washings were clear; the small cake obtained was dissolved in 15 ml. of boiling ethanol. After standing overnight, 1.0 of pure dye were obtained. M.P. = 145° C./decomposition λ max. = 484 nm. (ethanol).

EXAMPLE 12

1-phenyl-2-ethyl-3-furyl-4-[(1'-ethyl-5',6'-dimethyl-benzothiazole-2'-ylidene)-ethylidene]-2-pyrazolin-5-one ethyl-sulfate

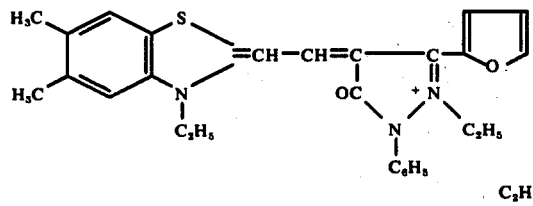

2.33 g. of 2-formyl-methylene-3-ethyl-5,6-dimethyl-benzothiazole and 2.26 g. of 1-phenyl-3-furyl-2-pirazolin-5-one were dissolved in a mixture formed by 10 ml. of acetic anhydride and 5 ml. of acetic acid and the solution was boiled for 5 minutes. After overnight standing, the dye separated out from solution; it was collected on a buchner and washed repeatedly with ethanol until the washing was clear. The solid obtained yields 2.0 g. of raw dye which was purified by crystallization from dimethylformamide (16 ml.). 1.2 g. of pure dye were obtained. The quaternarization was carried out by heating the merocyanine dye with 3 ml. of freshly distilled diethylsulfate at 120° C. for 105 minutes. After cooling, the viscous reaction mixture was stirred in ether. The crude dye obtained was crystallized from a mixture diethylformamide-ethanol 1:1. Yield: 0.5 g. of pure dye. M.P. = 255°-261° C. λ max. = 423 nm. (dimethylformamide-ethanol).

EXAMPLE 13

2-methyl-3-thienyl-4-[(1'-ethyl-3',3'-dimethyl-5'-phenylsulfonyl-indolenine-2'-ylidene)-ethylidene]-2-isoxazolin-5-one iodide

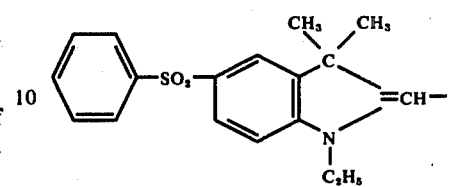

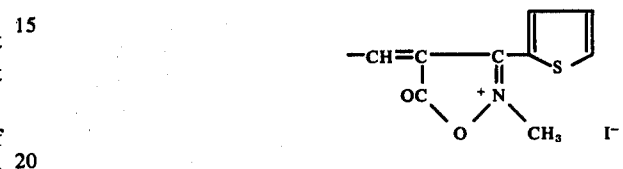

3.55 g. of 1-ethyl-2-formyl-methylene-3,3-dimethyl-5-phenylsulfonyl-indolenine and 1.67 g. of 3-thienyl-2-isoxazolin-5-one were dissolved in a mixture consisting of 10 ml. of acetic anhydride and 5 ml. of acetic acid and the obtained solution was heated to reflux for 5 minutes. The crude dye, precipitated during the heating and after cooling, was collected on a buchner and washed with ethanol and ether. It was then ground in a mortar by washing with ethanol and washed again thoroughly with ether. The pure merocyanine, thus obtained [4 g. = λ max = 486 (dimethylformamide-ethyl alcohol)] was then quaternized by reacting with 9 ml. of freshly purified dimethylsulfate at 120° C. for 15 minutes. After cooling, the reaction mixture was poured into ether; the semi-solid gummy product obtained after overnight standing was precipitated as iodide salt from an alcoholic solution by adding to it an aqueous solution (10%) of potassium iodide. The solid dye, filtered on a buchner, was purified by repeatedly washings with ethanol and ether. Yield: 4.0 g. of pure dye having M.P. = 155°-163° C. λ max = 464 nm. (toluolated ethanol).

EXAMPLE 14

2-methyl-3-thienyl-4-[1',3'-diphenyl-6'-nitro-imidazo-[4,5-b]-quinoxaline-2'-ylidene)-ethylidene]-2-isoxazolin-5-one methylsulfate

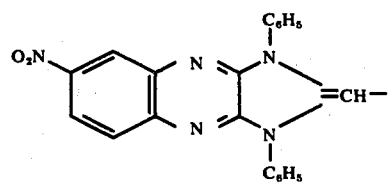

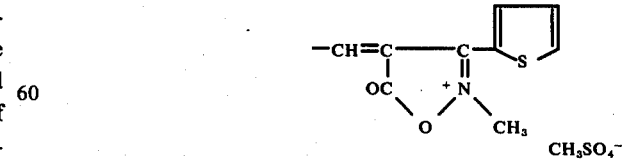

A solution consisting of 10 ml. of acetic anhydride, 5 ml. of acetic acid, 3.73 g. of 1,3-diphenyl-2-formyl-methylene-6-nitro-imidazo-[4,5-b]-quinoxaline, 1.67 g. of 3-thienyl-2-isoxazolin-5-one was boiled for 5 minutes. The dye was hot filtered on a buchner and purified by crystallization from 95 ml. of dimethylformamide. The pure dye obtained (3.3 g.) presented a λ max = 521 nm. (dimethylformamide-methyl alcohol). The quaternarization of the merocyanine was carried out by heating at 130° C. for 1 hour a mixture consisting of 3.3 g. of merocyanine and 30 ml. of freshly distilled dimethyl-sulfate. After cooling, the reaction mixture was poured into ethyl ether: the separated gummy product was treated with 25 ml. of boiling ethanol. The solid obtained was dried under vacuum. Yield: 2.16 g. M.P. =>300° C. λ max = 488 nm (dimethylformamide-methyl alcohol).

The dyes of the present invention are powerful desensitizers for light sensitive silver halide emulsions and therefore can be used in those photographic elements wherein desensitization is required, such as for instance in the manufacture of emulsions used for the production of direct positive images, as described by Kendall et al. in U.S. Pat. No. 2,541,472 or in U.S. Pat. No. 2,669,515 and by Hilson et al. in U.S. Pat. No. 3,062,651, etc.

The cyanine dyes of this invention are useful electron acceptor spectral sensitizers for direct positive emulsions, since the direct positive emulsions, which contain them, have an improved sensitivity.

To prepare photographic emulsions, the dyes according to the present invention are conveniently incorporated into the finished emulsions and of course uniformly distributed throughout the emulsion. The methods of incorporating the dyes into the emulsion are relatively simple and well-known to those skilled in the art. It is convenient to add the dyes e.g. in the form of solutions with a suitable solvent selected from among those having no harmful effect upon the finished emulsion. Methanol, ethanol, isopropyl alcohol, pyridine, water, etc., alone or in combination, are useful solvents to dissolve the dyes according to the present invention.

The silver halide emulsions that can be sensitized with the new dyes of this invention can be all those prepared using any of the water-permeable hydrophylic colloids, natural or synthetic, generally used in the photographic art, e.g. gelatin, colloidal albumin, agar-agar, arabic gum, alginic acids, hydrophylic synthetic polymers, such as polyvinyl alcohol, polyvinyl pyrrolidone, cellulose esters, partially hydrolized cellulose acetate, etc. These hydrophylic colloidal substances and others still can be used either alone or in admixture with one or more of the said colloids, as it is known in the art of emulsion making.

The concentration of the new dyes in the emulsion may vary over a considerable range, generally from 10 to 1000 mg. per mole of silver halide. The specific concentration will vary according to the type of the emulsion to be used and according to the required effects.

The most convenient concentration of the dye for each given emulsion can be easily determined by making concentration series and relative measurements and examinations which are well-known to those skilled in the art. The emulsion containing the dyes according to this invention can be conveniently coated on any support material used for the production of photographic materials, such as glass, paper, cellulose acetate, cellulose nitrate, resin coated paper, e.g. polyethylene or polypropylene (which may be electron bombarded to promote emulsion adhesion), film-forming synthetic resins, polyesters, polyamides, polystyrene, and the like.

The dyes according to the present invention are useful electron acceptor spectral sensitizers which can be used in all types of direct positive emulsions either alone or in mixture with other sensitizing dyes of the invention or known in the art in order to obtain the desired effect.

The direct positive emulsions can be fogged in any way known to those skilled in the art, such as e.g. by means of light, or of chemical fogging agents, such as e.g. stannous chloride, formaldehyde, thiourea dioxide, and the like. The emulsions can be fogged either by addition of a reducing agent, such as those described above, and of a metal more electropositive than silver, such as a gold salt, e.g. potassium chloro-aurate, as described in GB 723,019. Another method for making direct positive silver halide emulsions with improved sensitometric properties provides fogging the silver halide grains in at least one stage of the preparation of the emulsions (a) in the presence of at least 100 micromoles per mole of silver halide of at least one salt of a metal more electropositive than silver, (b) in the presence of a low concentration of silver ions, (c) in the presence of hydrogen ion concentration below 6.0 or above 8.0, pH units.

This fogging method as well as the direct positive emulsions manufactured thereby and photographic elements containing such emulsions are described in the commonly owned IT Pat. Application Ser. No. 49,377A/74, filed Mar. 21, 1974.

The dyes of this invention can be incorporated also in direct positive emulsions of the type wherein halide grains have a silver salt central core insoluble in water and an outer shell consisting of a fogged silver salt insoluble in water which can be developed to metallic silver without any exposure. The dyes according to the present invention are preferably incorporated into the fogged outer shell. These emulsions can be prepared in several ways, such as those described in U.S. Pat. No. 3,367,778.

The dyes according to the present invention are electron acceptor spectral sensitizers which can be used also in high-sensitivity direct positive emulsions, such as those described in U.S. Pat. No. 3,501,307.

The silver halides used for the preparation of the direct positive photographic emulsions, according to this invention, comprise any type of silver halides, such as silver bromide, silver iodide, silver chloride, silver chloro-iodide, silver bromo-iodide, silver bromo-chloride, and the like.

The silver halide grains may be regular and of any crystalline shape, such as cubic or octahedral shape, as described in U.S. Pat. No. 3,501,306. Such grains advantageously have a narrow distribution curve, as described in U.S. Pat. No. 3,501,305. It is further known that emulsions having silver halide grains with an average diameter lower than 1 μ, preferably 0.5 μ, are particularly useful.

The direct positive emulsions sensitized with the dyes according to the present invention may also contain color-formers dissolved in the layer in a suitable solvent or added as dispersions in a crystalloidal solvent, such as for instance di-n-butylphthalate, tricresylphosphate, etc.

EXAMPLE 15

The dyes in examples 5 to 14 were photographically tested as electron acceptor spectral sensitizers for fogged direct positive emulsions by adding the sensitizers dissolved in a suitable solvent in the concentration reported in Table I, of mg. of the dye per mole of silver.

The final emulsion, ready to be coated, had a pH = 6 and a pAg = 8.5. After having been coated, a sample of each coating was exposed in a sensitometer and in a spectrograph using a tungsten lamp, developed at 20° C. for 3 minutes with the Kodak D-19b developer having the following composition:

| Metol | 2.2 g. |
|---|---|
| Sodium sulfite, anhydrous | 72 g. |
| Hydroquinone | 8.8 g. |
| Sodium carbonate, anhydrous | 48 g. |
| Potassium bromide | 4 g. |
| Water to make | 1,000 ml. | then fixed, washed and dried. The results thereof are reported in Table I. The same emulsion containing the same quantity of yellow-pinakryptol as electron acceptor was taken as a reference test. The sensitivity is expressed in log It relative to the yellow pinakryptol containing coating which is taken as a reference. Minus sign means lower sensitivity and plus sign means higher sensitivity.

The dyes of the present invention can be used also as bleachable filter dyes useful in photography.

TABLE 1

| Example No. | Concentration mg./M Ag | Relative sensitivity | Sensitivity maximum(nm) | Sensitivity range (nm) |
|---|---|---|---|---|
| Yellow-pinacryptole | 400 | TEST | 390 | 350–510 |
| 5 | " | + 1.10 | 530 | 350–570 |
| 6 | " | + 1.20 | 530 | 350–580 |
| 7 | " | + 0.90 | 520 | 350–570 |
| 8 | " | + 0.80 | 535 | 350–590 |
| 9 | " | + 0.30 | 530 | 350–570 |
| 10 | " | + 0.30 | 535 | 350–590 |
| 11 | " | + 0.45 | 540 | 350–600 |
| 12 | " | + 0.45 | 460 | 350–530 |
| 13 | " | + 0.90 | 525 | 350–570 |
| 14 | " | + 0.30 | 540 | 350–580 |

Compounds of examples No. 5, 6, 7, 8, 12, 13 of the present invention were tested in the direct positive emulsion described in Example 15, in comparison with the following dyes outside the present invention and considered here for comparison purposes only. (see Table 2).

TABLE II

TABLE II-continued

| Example | Dyes | Bibl. Reference |
|---|---|---|
| | (chemical structures) | Belg. Pat. No. 816,503, filed June 18, 1974 |
| 7) | (chemical structure) | |
| | (chemical structures) | US 3,539,349 (Ex. No. 2) |
| 8) | (chemical structure) | |
| | (chemical structures) | US 3,539,349 (Ex. No. 1) |
| 12) | (chemical structure) | |
| | (chemical structures) | US 3,539,349 |

All dyes reported in Table II, dissolved in a suitable solvent, in the concentration reported in Table III of 60 mg. of dye per mole of silver, were tested as electron acceptor spectral sensitizers, following the same procedure described in example 15.

Figure 2:
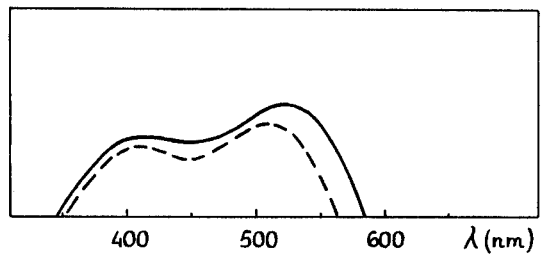
Figure 3:
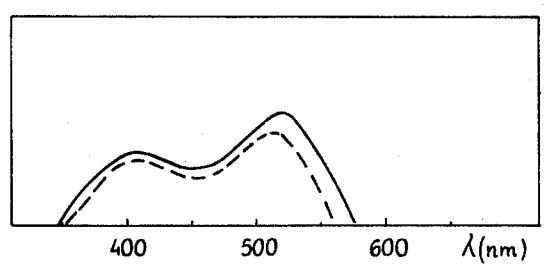
Figure 4:
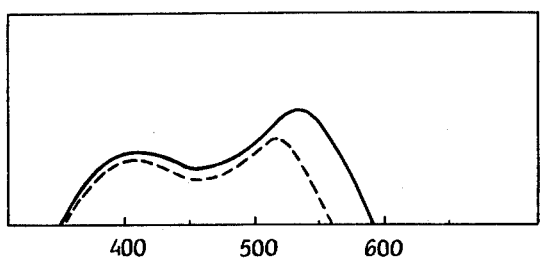
Figure 5:
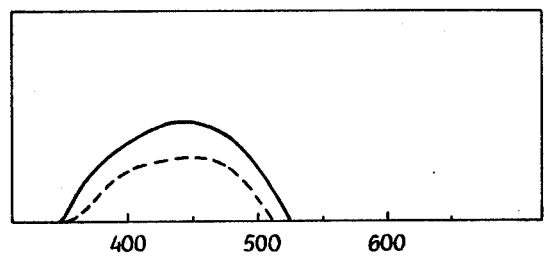

The sensitivity results are expressed in Table III. The corresponding Jarrel-Ash spectra are reported in FIGS. 1 to 5.

Figure 6:
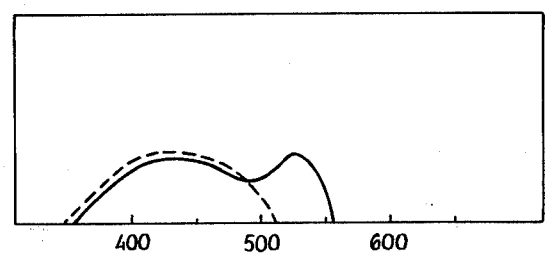
Figure 7:
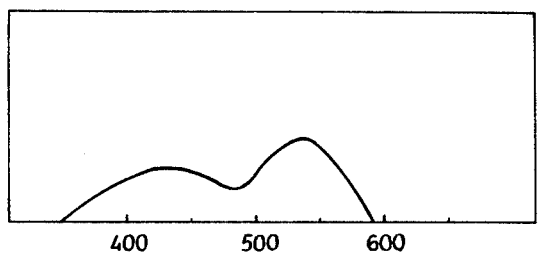
Figure 8:
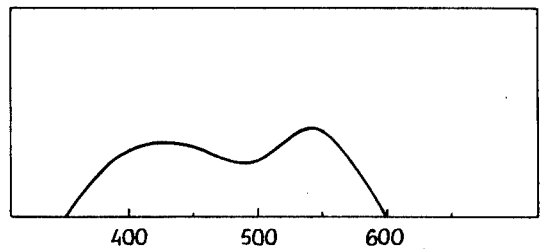
Figure 9:
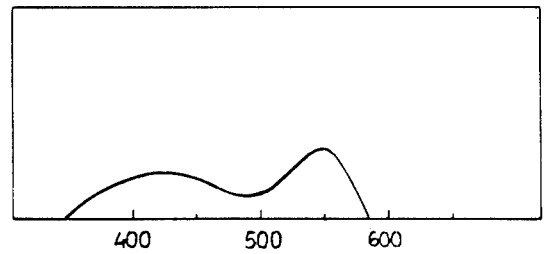

In FIGS. 6 to 9 are also reported the spectra of Examples 9, 10, 11, 14 of the present invention tested in the above described experimental conditions (see Table I).

TABLE III

| Dyes | Concentration mg./MAg | Relative Sensitivity | Sensitivity Maximum (nm) | Sensitivity Limits (nm) |
|---|---|---|---|---|
| 5 | 400 | +1.10 | 530 | 350–570 |
| 13 | " | +0.90 | 525 | 380–570 |
| A | " | +0.80 | 510 | 350–550 |
| 6 | " | +1.20 | 530 | 350–580 |
| B | " | +1.10 | 515 | 350–560 |

TABLE III-continued

| Dyes | Concentration mg./MAg | Relative Sensitivity | Sensitivity Maximum (nm) | Sensitivity Limits (nm) |
| --- | --- | --- | --- | --- |
| 7 | " | +0.90 | 520 | 350–570 |
| C | " | +0.70 | 515 | 350–560 |
| 8 | " | +0.80 | 535 | 350–590 |
| D | " | +0.50 | 510 | 350–560 |
| 12 | " | +0.45 | 460 | 350–530 |
| E | " | 0.00* | 460 | 350–510 |

*Referred to yellow-pinakryptol containing coating.

What we claim is:

1. A light-sensitive direct positive silver halide emulsion characterized by having in the emulsion a sensitizing amount of at least one quaternized merocyanine dye characterized by corresponding to one of the following formulae:

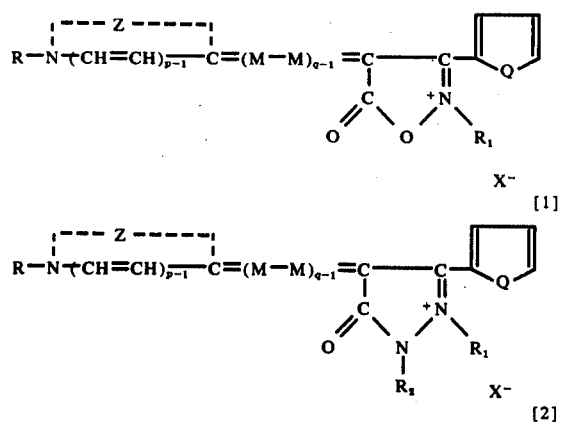

wherein $p$ and $q$ each represents a positive integer of from 1 to 2; M represents a methine link; R and $R_1$ each represents an alkyl group containing from 1 to 4 carbon atoms, or a substituted alkyl group containing from 1 to 4 carbon atoms, an acyloxyalkyl group, an alkoxycarbonylalkyl group, an aryl group or a substituted aryl group, an aralkyl group, and an alkenyl group; $R_2$ represents an alkyl group and an aryl group; $X^-$ represents an acid anion; Q represents O, S, NH; Z represents the nonmetallic atoms selected from C, O, S, Se, or N required to complete a heterocyclic nucleus containing from 5 to 6 atoms in the heterocyclic ring.

2. The direct positive emulsion of claim 1 wherein (M—M) is —CH=CH— and $p$ is 2.

3. The direct positive emulsion of claim 1 wherein the quaternized merocyanine dye is characterized by the fact that the nucleus:

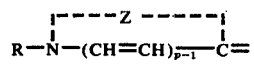

is selected from the group consisting of a 2,3,3,-trimethyl-5-phenyl-sulfonyl-indolenine, a 2,3,3-trimethyl-5-benzoylindolenine, a 1-alkyl-2-phenyl-5-phenyl-sulfonyl-indole, a 1-aryl-2-phenyl-5-phenyl-sulfonyl-indole, a 1-alkyl-2-phenyl-5-benzoyl-indole, a 1-aryl-2-phenyl-5-benzoyl-indole, a dihalogeno-benzothiazole, an imidazo-[4,5-b]-quinoxaline, a nitrobenzothiazole and a nitrobenzoxazole.

4. A light-sensitive direct positive silver halide emulsion according to claim 1 characterized by the fact that said quaternated merocyanine dye is selected from the group consisting of a:
- 2-methyl-3-furyl-4-[(1'-ethyl-3',3'-dimethyl-5'-phenyl-sulfonyl-indolenine 2'-ylidene)-ethylidene]-2-isoxazolin-5-one perchlorate;
- 2-methyl-3-furyl-4-[(1'-ethyl-3',3'-dimethyl-5-benzoyl-indolenine-2'-ylidene)-ethylidene]-2-isoxazolin-5-one perchlorate;
- 2-methyl-3-furyl-4-[(3'-ethyl-6'-nitro-benzothiazole-2'-ylidene)-ethylidene] 2-isoxazolin-5-one methyl-sulfate;
- 2-methyl-3-furyl-4-[(1',3'-diethyl-imidazo-[4,5-b]-quinoxaline-2'-ylidene) ethylidene]-2-isoxazolin-5-one iodide;
- 1-phenyl-2-ethyl-3-furyl-4-[(1'-ethyl-3',3'-dimethyl-5'-benzoyl-indolenine 2'-ylidene)-ethylidene]-2-pyrazolin-5-one ethyl-sulfate;
- 2-methyl-3-thienyl-4-[(1'-ethyl-3',3'-dimethyl-5'-phenyl-sulfonyl-indo lenine-2'-ylidene)-ethylidene]-2-isoxazolin-5-one iodide.

5. Photographic element comprising a base having coated thereon at least one layer containing a direct positive emulsion according to claim 2.

6. Photographic element comprising a base having coated thereon at least one layer containing a direct positive emulsion according to claim 4.

7. Photographic element comprising a base having coated thereon at least one layer containing a direct positive emulsion according to claim 1.

* * * * *

UNITED STATES PATENT AND TRADEMARK OFFICE
CERTIFICATE OF CORRECTION

PATENT NO. : 4,035,190
DATED : July 12, 1977
INVENTOR(S) : Paolo Beretta and Luigi Magnani It is certified that error appears in the above-identified patent and that said Letters Patent are hereby corrected as shown below:

Column 4, line 57, "1,3-diethyl-imidazo[4,5-b]quinoxaline" should be --1,3-diallyl-imidazo[4,5-b]quinoxaline--.

Claim 4, line 6, "indolenine 2'-ylidene" should be --indolenine-2'-ylidene--.

Claim 4, line 12, "-ethylidene] 2-isoxazolin" should be -- -ethylidene]-2-isoxazolin --.

Claim 4, line 15, "-ylidene) ethylidene]" should be -- -ylidene)-ethylidene] --.

Claim 4, line 18, "indolenine 2'-ylidene)" should be --indolenine-2'-ylidene)--.

Signed and Sealed this

Twenty-second Day of November 1977

[SEAL]

Attest:

RUTH C. MASON
*Attesting Officer*

LUTRELLE F. PARKER
*Acting Commissioner of Patents and Trademarks*